(12) United States Patent
Iinuma

(10) Patent No.: US 8,842,333 B2
(45) Date of Patent: Sep. 23, 2014

(54) IMAGE FORMING APPARATUS AND METHOD OF CONTROLLING IMAGE FORMING APPARATUS

(75) Inventor: Osamu Iinuma, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 772 days.

(21) Appl. No.: 12/535,214

(22) Filed: Aug. 4, 2009

(65) Prior Publication Data

US 2010/0053648 A1 Mar. 4, 2010

(30) Foreign Application Priority Data

Aug. 26, 2008 (JP) .................................. 2008-216918

(51) Int. Cl.
*G06F 15/00* (2006.01)
*H04N 1/40* (2006.01)
*H04N 1/62* (2006.01)

(52) U.S. Cl.
CPC ...................................... *H04N 1/62* (2013.01)
USPC ............. 358/1.9; 358/2.1; 358/518; 382/162; 382/167

(58) Field of Classification Search
None
See application file for complete search history.

(56) References Cited

U.S. PATENT DOCUMENTS

| 6,519,050 B1 * | 2/2003 | Eintracht et al. ............. 358/1.15 |
| 7,426,060 B2 * | 9/2008 | Nishide et al. ................. 358/1.9 |
| 7,821,659 B2 * | 10/2010 | Kodama et al. ............. 358/1.15 |
| 2009/0268251 A1 * | 10/2009 | Nishide ......................... 358/2.1 |

FOREIGN PATENT DOCUMENTS

| JP | 2005229475 | 8/2005 |
| JP | 2008-28917 | 2/2008 |

OTHER PUBLICATIONS

U.S. Appl. No. 12/424,296, filed Apr. 15, 2009. Applicants: Reiji Misawa, et al.

* cited by examiner

*Primary Examiner* — Thomas Lett
(74) *Attorney, Agent, or Firm* — Fitzpatrick, Cella, Harper & Scinto

(57) ABSTRACT

An image forming apparatus not having a spot color printing function and connected a network cannot print out a proper image from image data which is already processed for spot color and stored in an image forming apparatus having a spot color printing function. When the image data subjected to the spot color process is stored in the image forming apparatus having the spot color printing function, difference information is stored together with the image data subjected to the spot color process. In order to print the data by a four-color output type of image forming apparatus not having the spot color printing function, the data is restored into four-color image data on the basis of the difference information, and the four-color image data is transmitted to the image forming apparatus not having the spot color printing function.

4 Claims, 23 Drawing Sheets

IMAGE FORMING APPARATUS AND METHOD OF CONTROLLING IMAGE FORMING APPARATUS

BACKGROUND OF THE INVENTION

1. Field of the Invention

The present invention relates to an image processing method for efficiently printing out image data for spot color printing by use of an image forming apparatus which is not compatible with the spot color printing.

2. Description of the Related Art

In recent years, digital printing techniques have steadily been increasing their utility values in markets, such as an on-demand printing market and a small-lot document printing market. Particularly, full-color printing using an electrophotographic technique is in a superior position to other printing techniques in light of productivity, printing costs, easy maintenance, and so forth and is therefore rapidly expanding the market. In terms of such color printing, attention is drawn to not only conventional full-color printing according to electrophotographic printing that uses four color toners of C (cyan), M (magenta), Y (yellow), and K (black) but also multiple-color printing methods using an additional special toner. Accordingly, these multiple-color printing techniques are now with an eye toward a market of special printing that highly requires on-demand and immediate printing performance. Such special toners include, for example, a transparent toner which is capable of absorbing irregularities on a surface of a printed sheet and achieving high glossiness, and a light toner which is capable of reducing roughness of a highlighted part. By using the special toners, it is possible to gain new added-values that are different from what is obtainable by normal digital printing, and hence to further expand the world of digital printing. From the above-described background, image forming apparatuses which are generally called multifunction printers (hereinafter referred to as "MFPs") and equipped with special toners are now being brought to the market in addition to conventional color MFPs configured to perform conventional four-color printing.

Moreover, for effectively using special toners, a large number of application software products capable of handling a spot color other than C, M, Y, and K are being brought to the market. It is possible to generate image data containing the spot color by using such application products.

Although image data containing a spot color has started to be used as described above, it is not always true that every MFP used today is compatible with the spot color. Specifically, it is highly likely that a print job is sent to a network which includes both of an MFP compatible with a spot color toner and an incompatible MFP using the conventional four colors of C, M, Y, and K. This situation causes a problem of inefficiency in which an unnecessary rendering operation for a spot color is performed even when image data containing the spot color is to be printed out by an MFP which is not compatible with the spot color. To solve this problem, Japanese Patent Laid-Open No. 2008-028917 discloses a method of determining prior to printing whether or not to use a spot color, and then determining whether to perform rendering for the spot color or rendering for the conventional four colors according to the determination result.

In recent years, environments have been created in which image data stored in a storage component of a certain MFP can be printed out by using another MFP connected to the same network. Under such an environment, the technique described in Japanese Patent Laid-Open No. 2008-028917 cannot deal with a case where image data stored in a spot color compatible MFP that has performed spot color printing of the image data is to be printed by another MFP not compatible with spot color printing. This is because the image data stored in the storage component of the spot color compatible MFP has already been rendered for the spot color. Therefore, when a conventional four color MFP is designated as a printer for printing the image data already rendered for the spot color, a problem arises that the MFP is incapable of printing the image data properly. To be more precise, the MFP is incapable of printing the image data from the beginning, or incapable of reproducing proper colors in a part of the image data rendered for spot color even when the MFP prints out the image data by using the four colors only.

SUMMARY OF THE INVENTION

An object of the present invention is to provide a technique for a technique for allowing even an MFP incompatible with spot color printing to print out an image with satisfactory quality from image data already rendered for spot color, when the MFP is designated as a printer for printing.

An image forming apparatus of the present invention which is connected to a network and provided with a spot color printing function, comprises: a generating component configured to generate spot color image data and four-color image data; a difference extracting component configured to extract difference information indicating a difference between each pixel value of a CMYK version of the spot color image data and a corresponding pixel value of the four-color image data, by using the spot color image data and the four-color image data, a storing component configured to store the spot color image data and the difference information; a determining component configured to determine, at a time of performing printing by a different image forming apparatus through the network, whether or not the different image forming apparatus has the spot color printing function; an image data restoring component configured to restore four-color image data by using the spot color image data and the difference information, which are stored in the storing component, when the determining component determines that the different image forming apparatus does not have the spot color printing function; and an image data transmitting component configured to transmit the restored four-color image data to the different image forming apparatus.

Alternatively, an image forming apparatus of the present invention which is connected to a network and provided with a spot color printing function, comprises: a user interface configured to receive an instruction from a user; a generating component configured to generate spot color toner print position information and four-color image data on the basis of an image design designated through the user interface; a component configured to store the four-color image data and the spot color toner print position information; a determining component configured to determine, at a time of performing printing by a different image forming apparatus through the network, whether or not the different image forming apparatus has the spot color printing function; and an image data transmitting component configured to transmit, not the spot color toner print position information, but the four-color image data to the different image forming apparatus, when the determining component determines that the different image forming apparatus does not have the spot color printing function.

According to the present invention, it is possible to store image data automatically in such a way as to obtain optimum image quality according to the type of an image forming apparatus in consideration of a possibility that the image forming apparatus at an output destination does not have a spot color printing function. Therefore, a user does not have to consider the types of image forming apparatuses in a network printing environment that includes both an image forming apparatus compatible with spot color printing and an image forming apparatus not compatible with spot color printing.

Further features of the present invention will become apparent from the following description of exemplary embodiments (with reference to the attached drawings).

DESCRIPTION OF THE EMBODIMENTS

Embodiment 1

Embodiment 1 of the present invention will be described below with reference to the accompanying drawings.

Embodiment 1 will be described by using an example in which image data subjected to spot color rendering is stored in a storage component inside an MFP 102 equipped with a spot color toner, and the image data is printed out by another MFP 103 equipped with no spot color toner (hereinafter, in this specification, the MFP 102 equipped with the spot color toner and having a spot color printing function will be simply referred to as an "equipped MFP 102" whereas the MFP 103 equipped with no spot color toner and having no spot color printing function will be referred to as a "non-equipped MFP 103").

In addition to the above-described case, the present invention is also applicable to an aspect in which image data containing spot color data is generated by an information processing device, sent from the information processing device to an MFP, and then printed out.

Note that techniques for compressing and decompressing image data described in this specification are not particularly limited, and it is possible to use publicly-known techniques such as the JPEG format.

Moreover, a spot color toner herein means a toner other than conventional color toners used for four-color printing. Such a spot color toner may be a "transparent toner" or a "light-color toner", for example. In the embodiment 1, the transparent color is used as spot color.

(Image Forming Apparatus)

Figure 1:
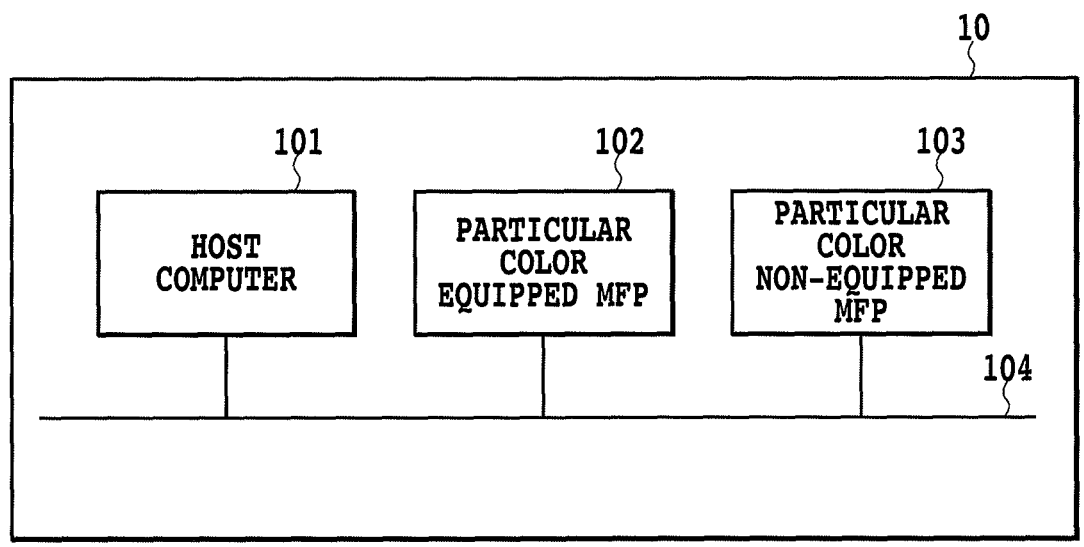
FIG. 1 is a block diagram showing an example of a network printing environment using an image forming apparatus according to the present invention.

FIG. 1 is a block diagram showing an example of a network printing system using an image forming apparatus.

The equipped MFP 102, the non-equipped MFP 103, and a host computer 101 are connected to a LAN 104 built in an office 10. The equipped MFP 102 and the non-equipped MFP 103 are able to interpret a page description language (hereinafter referred to as a PDL) transmitted from the host computer 101 through the PLAN 104 and to print out rendered image data. Moreover, the image data stored in a storage component inside the equipped MFP 102 can be transmitted to the non-equipped MFP 103 through the LAN 104 and printed by using the non-equipped MFP 103.

(Host Computer)

Figure 2:
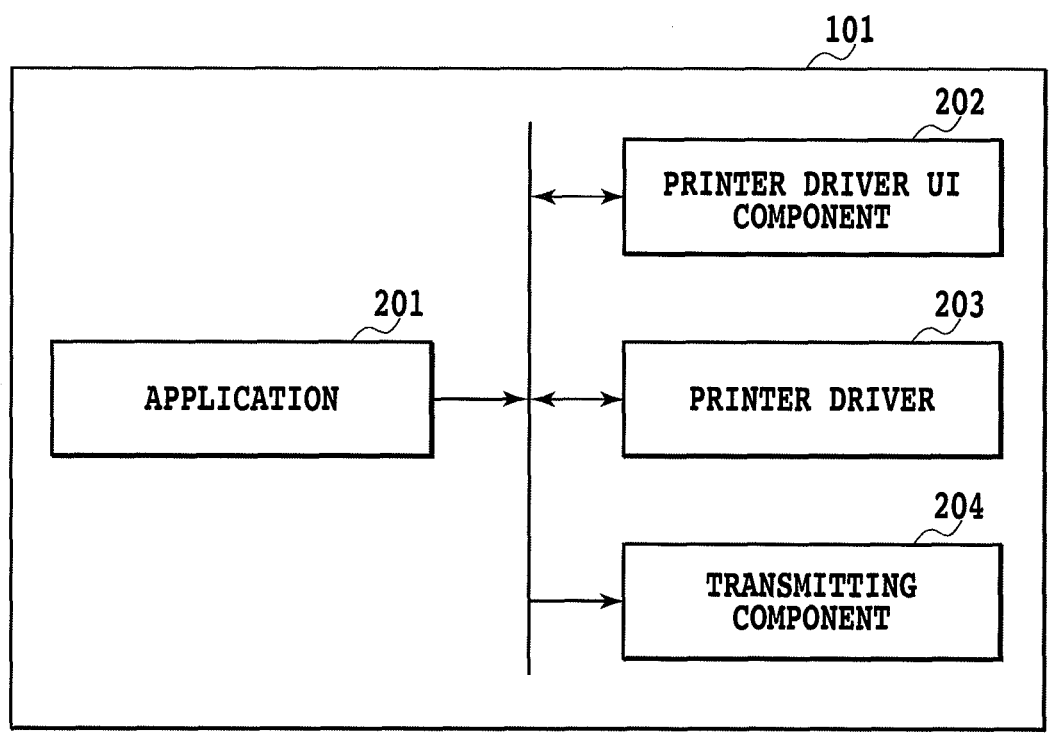
FIG. 2 is a block diagram showing a configuration of a host computer.

FIG. 2 is a view showing a configuration of the host computer 101.

Image data will be described by using an example in which the image data is generated by using a spot color provided in an application 201 (such data will be hereinafter referred to as "application data"). After receiving an instruction from a user to store the application data in the storage component inside the MFP, a printer driver user interface (UI) component 202 notifies a printer driver 203 of the instruction. The printer driver 203 converts the application data into PDL data. Examples of the PDL include LIPS and PS, for example. After the PDL data thus generated is sent to a transmitting component 204, the PDL data is transmitted to the equipped MFP 102.

(MFP)

Figure 3:
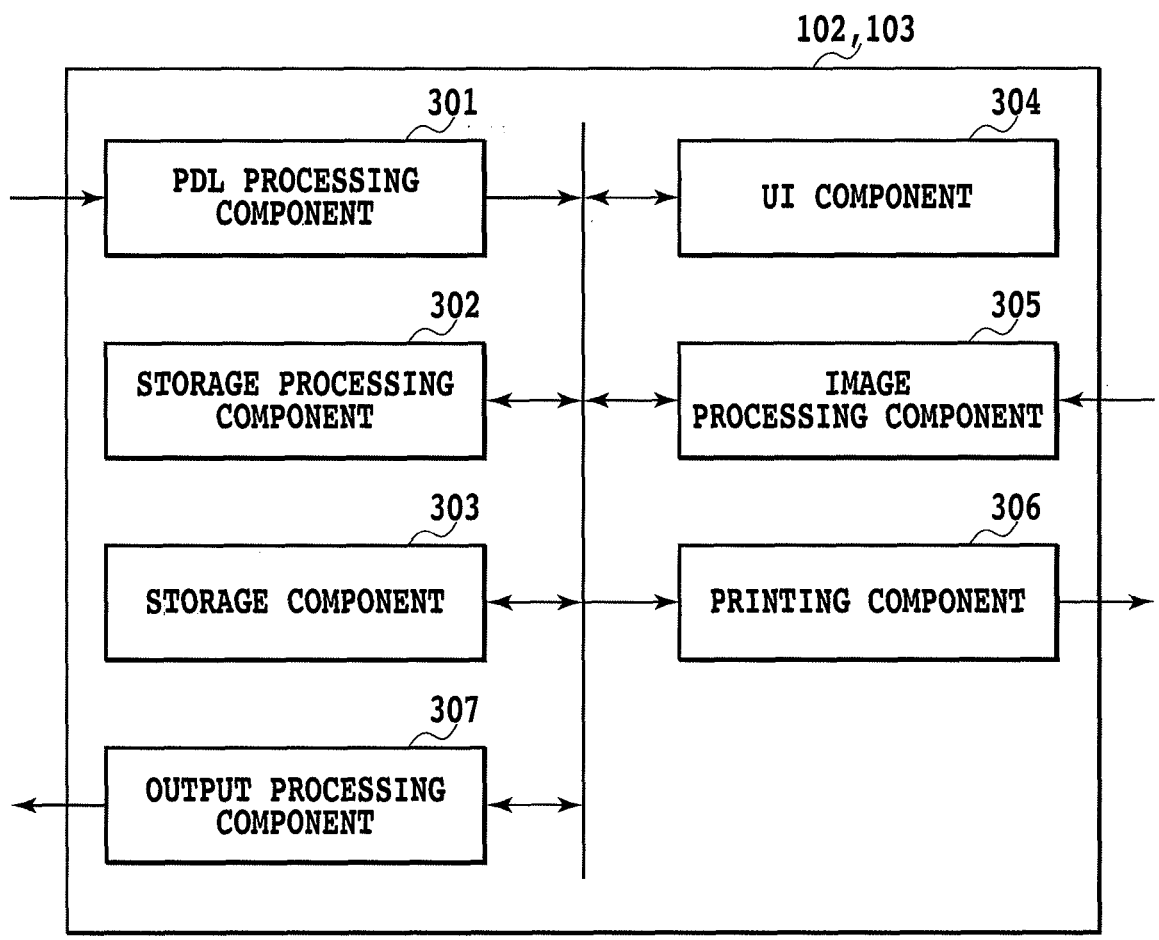
FIG. 3 is a block diagram showing a configuration of a multifunction printer (MFP)

FIG. 3 is a view showing a configuration of each MFP, which includes a PDL processing component 301, a storage processing component 302, a storage component 303, a UI component 304, an image processing component 305, a printing component 306, and an output processing component 307.

Figure 4:
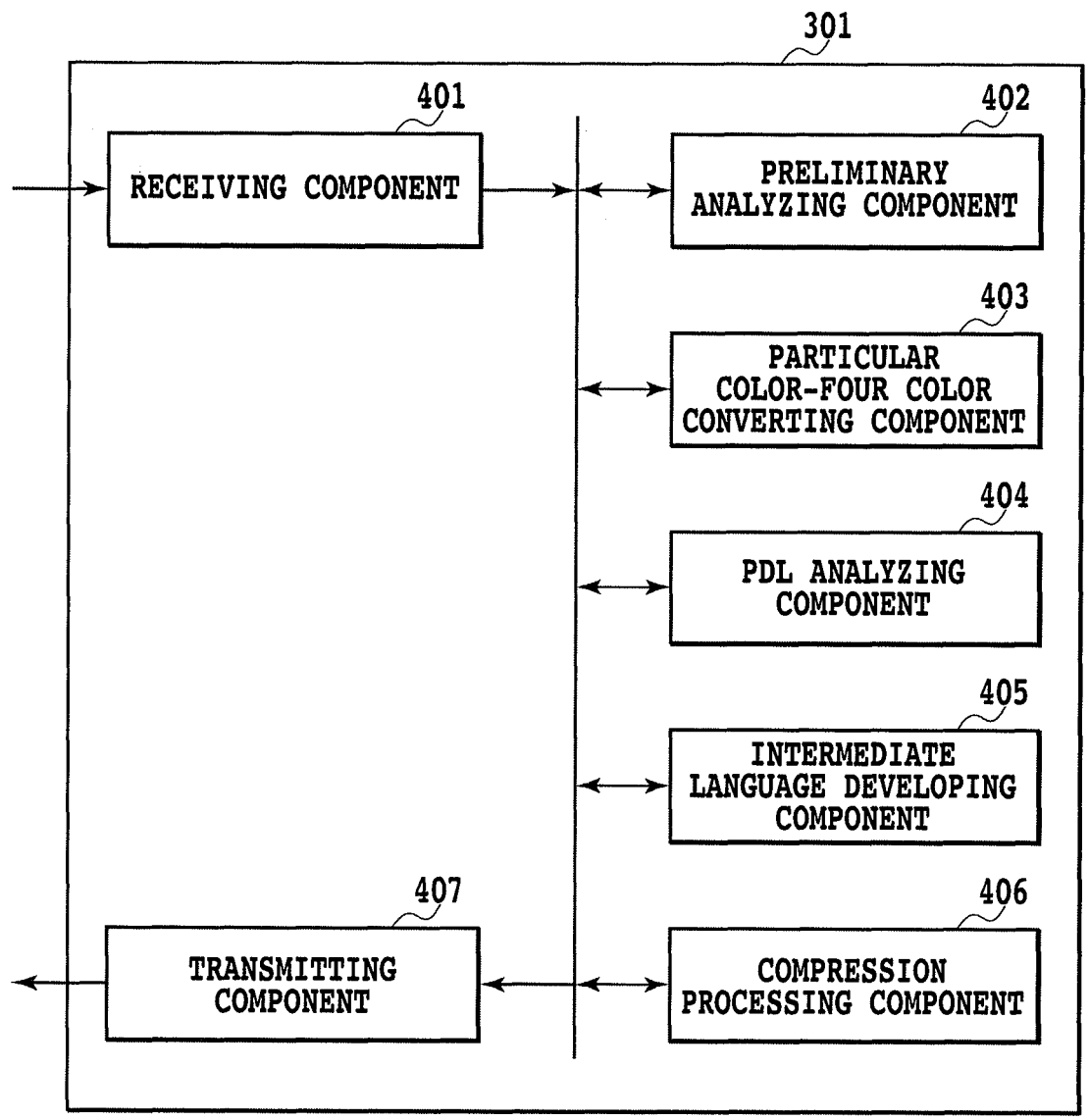
FIG. 4 is a block diagram showing a configuration of a page description language (PDL) processing component.

FIG. 4 is a view showing a configuration of the PDL processing component 301 in FIG. 3, which includes a receiving component 401, a preliminary analyzing component 402, a spot color-four color converting component 403, a PDL analyzing component 404, an intermediate language developing component 405, a compression processing component 406, and a transmitting component 407.

Figure 6:
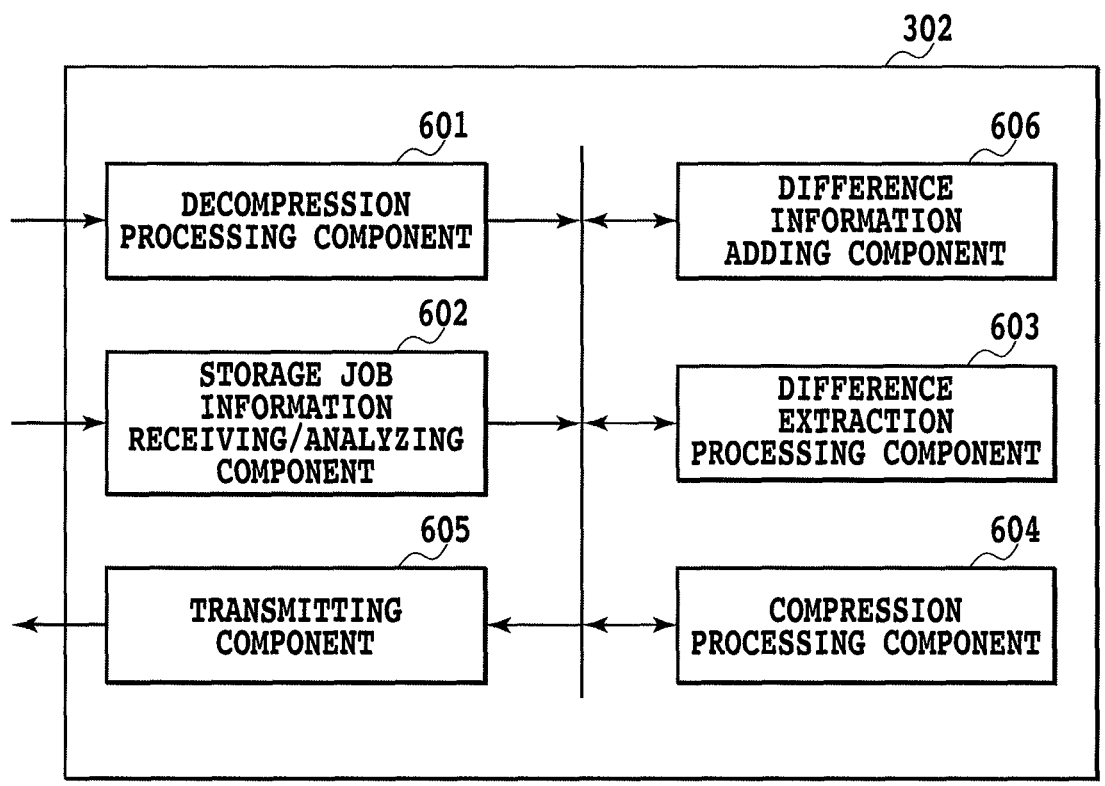
FIG. 6 is a block diagram showing a configuration of a storage processing component.

FIG. 6 is a view showing a configuration of the storage processing component 302 in FIG. 3, which includes a decompression processing component 601, a storage job information receiving/analyzing component 602, a difference extraction processing component 603, a compression processing component 604, a transmitting component 605, and a difference information adding component 606.

Figure 7:
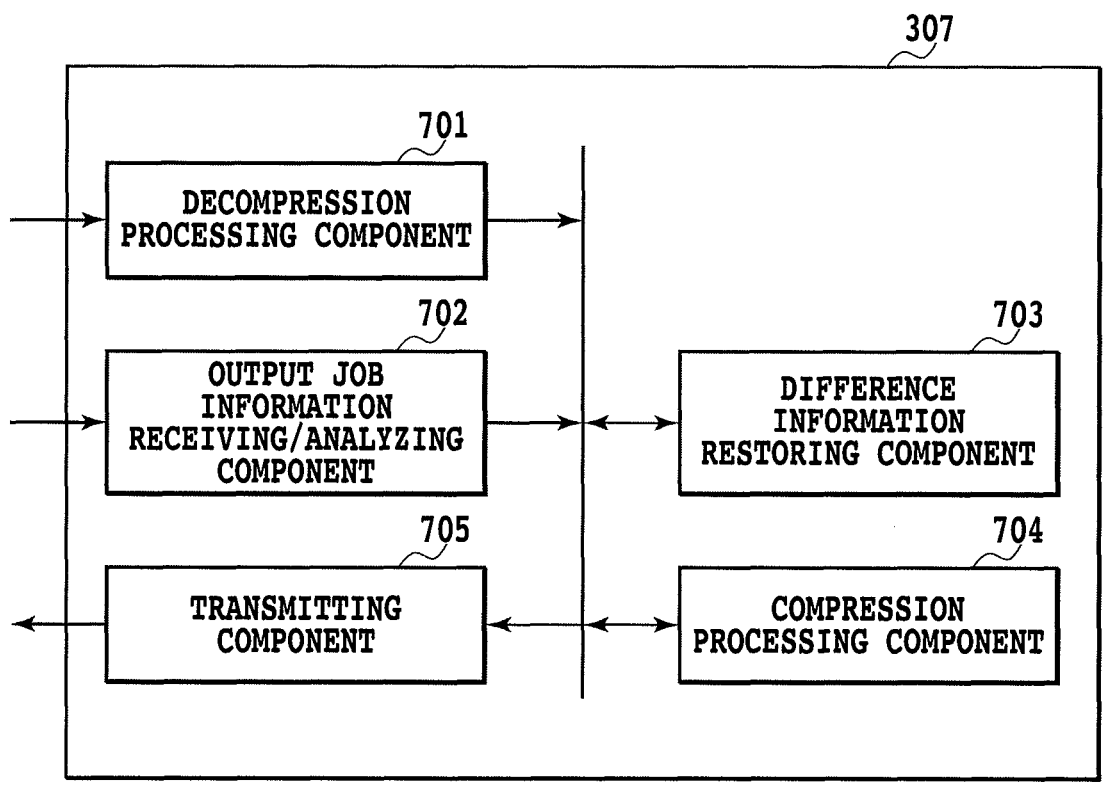
FIG. 7 is a block diagram showing a configuration of an output processing component.

FIG. 7 is a view showing a configuration of the output processing component 307 in FIG. 3, which includes a decompression processing component 701, an output job information receiving/analyzing component 702, a difference information restoring component 703, a compression processing component 704, and a transmitting component 705.

Figure 10:
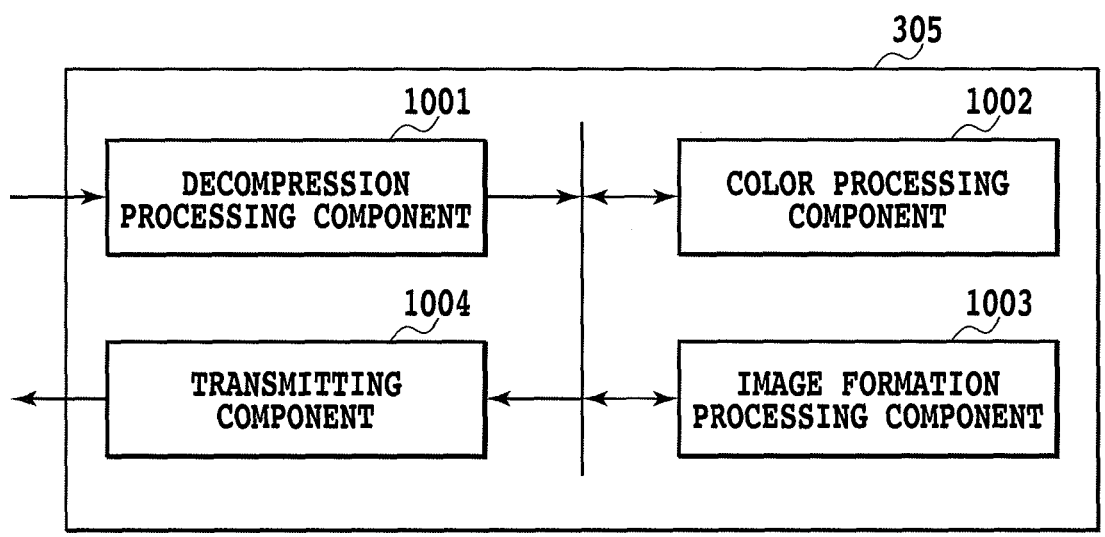
FIG. 10 is a block diagram showing a configuration of an image processing component.

FIG. 10 is a view showing a configuration of the image processing component 305 in FIG. 3, which includes a decompression processing component 1001, a color processing component 1002, an image formation processing component 1003, and a transmitting component 1004.

FIG. 5, FIG. 8, FIG. 9, and FIG. 11 are flowcharts for explaining outlines of processing to be executed by the respective components constituting the image forming apparatus according to Embodiment 1. Specifically, FIGS. 5, 8, 9, and 11 correspond to the PDL processing component 301, the storage processing component 302, the output processing component 307, and the image processing component 305, respectively.

Figure 22:
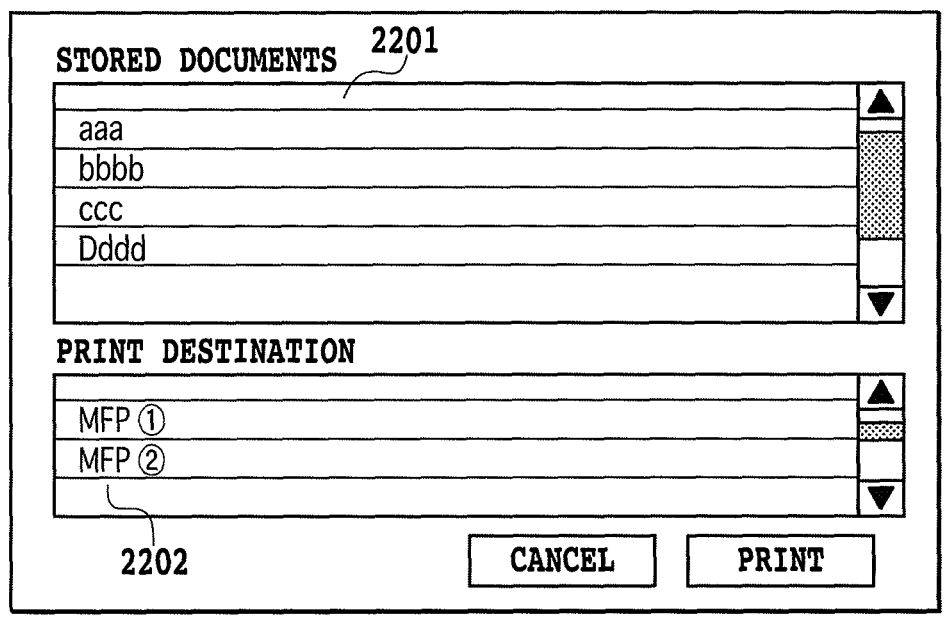
FIG. 22 is a view showing an example of a screen displayed on a panel screen of the MFP.

FIG. 22 shows an example of a screen to be displayed on a panel screen of the UI component 304 as a user interface. This embodiment will be described below on the assumption that the PDL data transmitted from the transmitting component 204 of the host computer is received by the receiving component 401 in the PDL processing component 301 of the equipped MFP 102.

(Description of PDL Processing Component)

Figure 5:
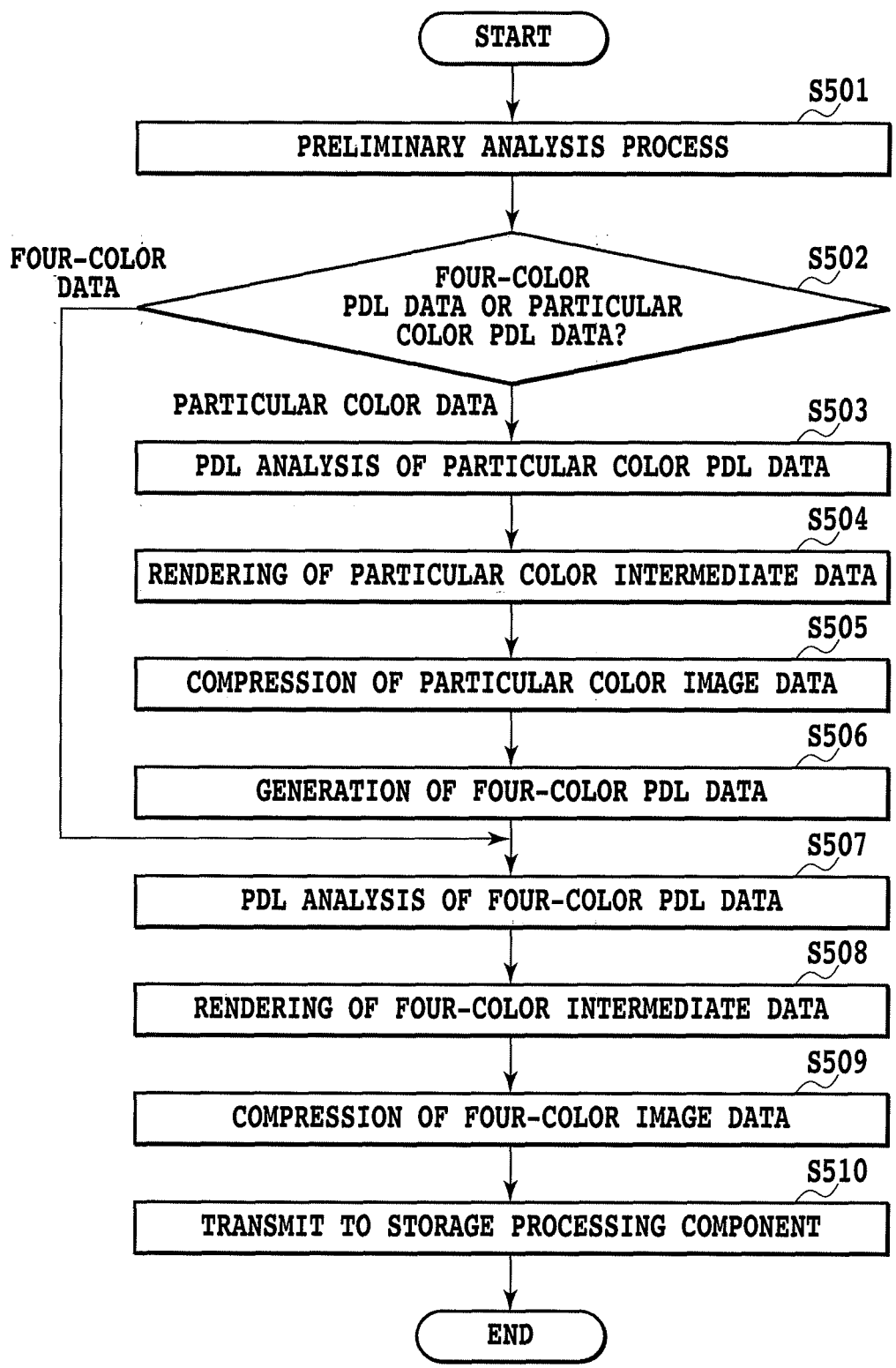
FIG. 5 is a flowchart showing an outline of processing executed by the PDL processing component.

Now, the PDL processing component 301 of the equipped MFP 102 will be described with reference to FIG. 4 showing the configuration thereof and FIG. 5 showing the process flow thereof.

First, from header information of the PDL data, the preliminary analyzing component 402 collects information required for determining whether or not it is necessary to subject the received PDL data to spot color process (S501).

Then, based on the information collected from the header information, determination is made as to whether or not it is necessary to perform the spot color process (S502). If the determination result shows that the spot color process is necessary, the processing proceeds to step S503. In step S503, the PDL analyzing component 404 performs a spot color PDL data analysis on the PDL data and generates an intermediate language (spot color intermediate data).

Next, in step S504, the intermediate language developing component 405 renders the intermediate language (the spot color intermediate data) and generates spot color image data. The spot color image data is composed of transparent data and CMYK data. The compression processing component 406 compresses the spot color image data thus generated and generates compressed spot color data (S505).

Next, in step S506, the spot color-four color converting component 403 converts spot color data into four-color data. The four-color data is composed of CMYK data. This conversion process is executed by using a spot color-four color lookup table which is registered in advance so as to generate four-color PDL data.

Then, in step S507, the PDL analyzing component 404 analyzes the four-color PDL data and generates an intermediate language (four-color intermediate data).

Next, in step S508, the intermediate language developing component 405 renders the intermediate language (the four-color intermediate data) and generates four-color image data. The compression processing component 406 compresses the four-color image data thus generated and generates compressed four-color data (S509).

Then, the compressed spot color data and the compressed four-color data are transmitted from the transmitting component 407 toward the decompression processing component 601 in the storage processing component 302 of the equipped MFP 102 (S510). Moreover, information on whether or not it is necessary to perform the spot color process is transmitted, as job information, toward the storage job information receiving/analyzing component 602 in the storage processing component 302 of the equipped MFP 102.

If the spot color process is determined to be unnecessary in the previous step S502, the processing proceeds from step S502 to step S507 and then the processes from step S507 to step S510 are sequentially executed. Specifically, the four-color intermediate data are generated by analyzing the received four-color PDL data (S507), and then the four-color intermediate data are rendered (S509) and compressed (S509). Thereafter, the compressed four-color data are transmitted to the storage processing component 302 (S510).

(Description of Storage Processing Component)

Figure 8:
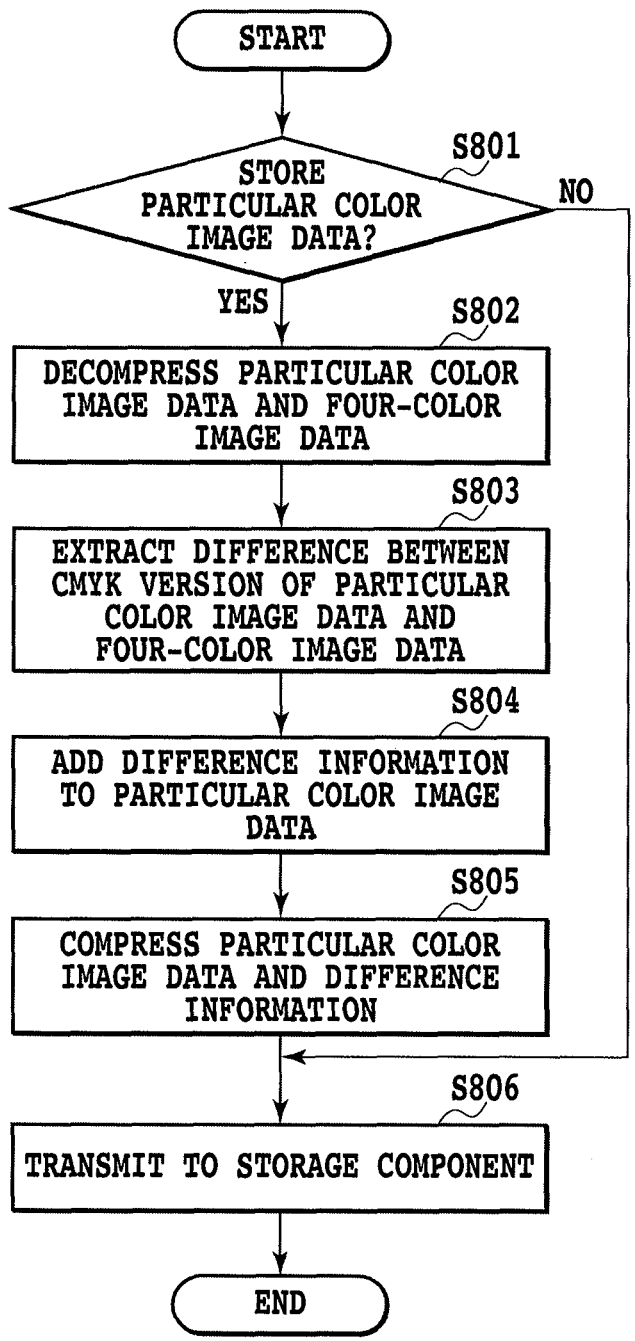
FIG. 8 is a flowchart showing an outline of processing executed by the storage processing component.

Next, the storage processing component 302 of the equipped MFP 102 will be described with reference to FIG. 6 showing the configuration thereof and FIG. 8 showing the process flow thereof.

The storage processing component 302 of the equipped MFP 102 is a module configured to execute processing which becomes necessary when the compressed data generated by the PDL processing component 301 is to be saved and stored in the storage component 303.

In this processing, the storage job information receiving/analyzing component 602 first determines whether or not the data to be processed from now contains the compressed spot color data (S801). If the compressed spot color data is determined to be present, the decompression processing component 601 decompresses both of the compressed spot color data and the compressed four-color data, and acquires the spot color image data and the four-color image data (S802).

Next, by using both types of the image data, the difference extraction processing component 603 extracts a difference between pixel value of each toner of a CMYK version of the spot color image data and the corresponding pixel value in the four-color image data (S803). Based on difference information thus extracted, the difference information adding component 606 adds this difference information to the spot color image data (S804).

Here, in step S804, the addition of the difference information may be performed on all the pixels or only pixels showing spot colors. By providing the difference information to the four-color image data only for the pixels showing spot color, it is possible to minimize an increase in the storage size of the image data.

Next, in step S805, the compression processing component 604 compresses the spot color image data together with the difference information and thereby generates the compressed spot color data. Here, the four-color image data is no longer needed and therefore discarded.

Lastly, the transmitting component 605 transmits the generated compressed spot color data to the storage component 303 of the equipped MFP 102 (S806).

If the compressed spot color data are not present in step S801, the transmitting component 605 transmits the compressed four-color data to the storage component 303 of the equipped MFP 102 as it is, that is, without executing any process on the compressed four-color data, the compressed four-color data having been received from the PDL processing component.

The data subjected to the above-described processes is saved and stored in the storage component 303.

(Description of Output Processing Component)

Figure 9:
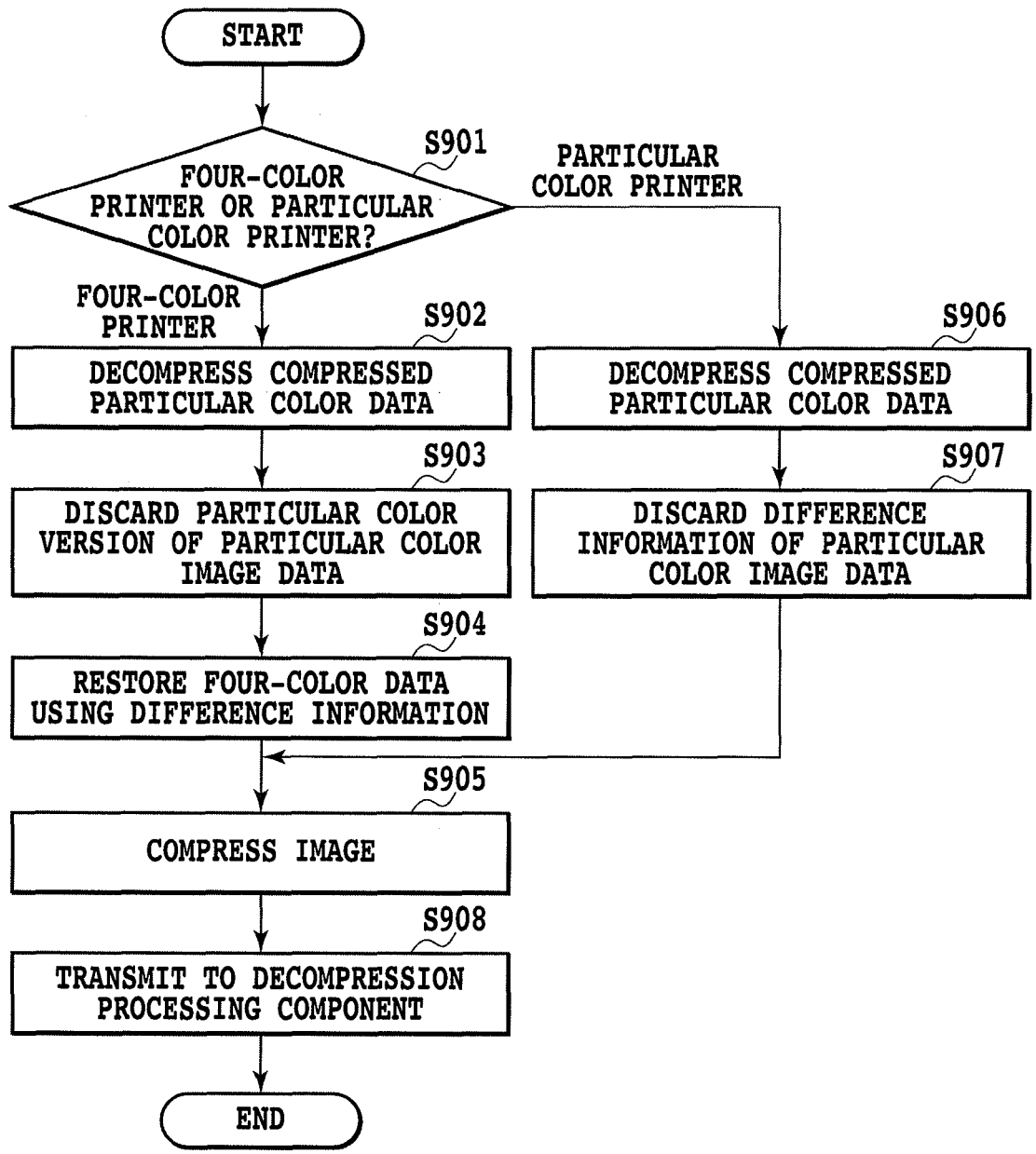
FIG. 9 is a flowchart showing an outline of processing executed by the output processing component.

Next, the output processing component 307 of the equipped MFP 102 will be described with reference to FIG. 7 showing the configuration thereof, FIG. 9 showing the process flow thereof, and also FIG. 22 showing an example of the panel screen of the MFP.

The output processing component 307 of the equipped MFP 102 is a module configured to execute processing which becomes necessary when the compressed data stored in the storage component 303 of the equipped MFP 102 is to be printed out by a different MFP.

In this processing, the user first selects a job stored in the storage component 303 from a stored document list 2201 (FIG. 22) on the panel screen. Subsequently, when the user selects which MFP to be used for printing from a print destination list 2202 (FIG. 22), information on the selected job and the print destination is transmitted to the storage component 303.

In this embodiment, descriptions will be first provided for a case where the print destination selected by the user is the non-equipped MFP 103, and then for a case where the print destination selected by the user is the equipped MFP 102.

First, upon receipt of the information from the UI component 304, the storage component 303 transmits the job selected from the stored document list 2201 by the user to the output processing component 307.

Then, the output job information receiving/analyzing component 702 of the output processing component 307 determines whether the MFP selected as the output destination is the non-equipped MFP 103 not having the spot color printing function or the equipped MFP 102 having the spot color printing function and using a spot color toner (S901). As described above, when printing the job by the different image forming apparatus through the network, determination is made as to whether or not the different image forming apparatus has the spot color printing function. If the determination result shows that the print output destination is the non-equipped MFP 103 that cannot perform spot color printing, the processing proceeds to step S902.

In step S902, the decompression processing component 701 decompresses the compressed spot color data of the job and transmits the spot color image data and the difference information obtained by this decompression to the difference information restoring component 703. The difference information restoring component 703 discards the unnecessary spot color version data from the spot color image data because the output destination is the non-equipped MFP (S903).

Then, in step S904, the four-color image data are restored by adding the pixel values in the difference information respectively to the pixel values of the four-color data (CMYK version) that remain after the spot color version of the data is discarded. The four-color image data can be reproduced into an optimum image even when the non-located MFP 103 compatible with the four-color output is used for the printing out, because the pixel values in the difference information are added to the four-color image data.

For example, when the spot color is "transparent", glossiness, which can be reproduced by using a transparent toner, can be reproduced by increasing overall amounts of color toners of CMYK or slowing down a fixation speed of a printer engine.

Thereafter, the compression processing component 704 compresses the restored four-color image data and thereby generates the compressed four-color data (S905).

Lastly, the transmitting component 7105 transmits the generated compressed four-color data to the decompression processing component 1001 in the image processing component 305 of the non-equipped MFP 103 (S909).

When the output job information receiving/analyzing component 702 determines in step S901 that the print output destination is the equipped MFP 102 having the spot color printing function, decompression process similar to step S902 is executed (S906) and then the difference information restoring component 703 discards only the difference information (S907).

Thereafter, the compression processing component 704 compresses the spot color image data after discarding the difference information and thereby generates the compressed spot color data (S905).

Lastly, the transmitting component 705 transmits the generated compressed spot color data to the decompression processing component 1001 in the image processing component 305 of the equipped MFP 102 (S908).

(Description of Image Processing Component)

Figure 11:
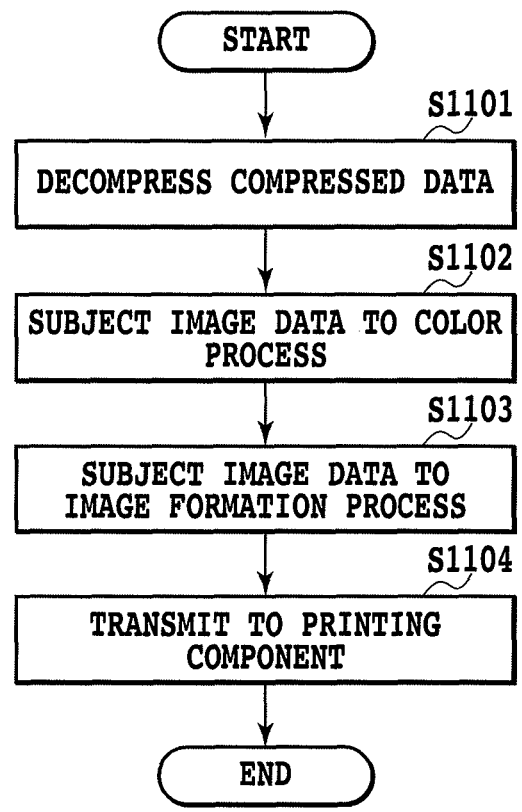
FIG. 11 is a flowchart showing an outline of processing executed by the image processing component.

Next, the image processing component 305 of the non-equipped MFP 103 which receives the compressed four-color image data (the compressed four-color data) from the output processing component 307 of the equipped MFP 102 will be described with reference to FIG. 10 showing the configuration thereof and FIG. 11 showing the process flow thereof.

The image processing component 305 of the non-equipped MFP 103 includes the decompression processing component 1001, the color processing component 1002, the image formation processing component 1003, and the transmitting component 1004.

First, the decompression processing component 1001 decompresses the compressed four-color data in step S1101.

Next, the color processing component 1002 executes a color process on the four-color image data obtained by the decompression, the color process including the providing of an optimum gamma characteristic for the printing out by the non-equipped MFP or the adjusting of color densities (S1102), and the like.

Next, the image formation processing component 1003 executes an image formation process such as a screen process or an error diffusion process (S1103).

Then, the transmitting component 1004 transmits print data subjected to the image formation process to the printing component 306 (S1104).

Upon receipt of the print data, the printing component 306 of the MFP 103 performs printing in the four colors of CMYK based on the print data.

Next, the processing of the image processing component 305 of the equipped MFP 102 in the case of selecting the equipped MFP 102 as the print destination will be briefly described.

The processing by the image processing component 305 of the equipped MFP 102 is basically the same except not only the four-color image data is subjected to the processes such as ones performed by the image processing component 305 of the non-equipped MFP 103 described above, but also the spot color version of the data is also subjected to the processes. Specifically, the color processing component 1002 executes the color process while the image formation processing component 1003 executes the image formation process on both of the four-color image data and the spot color version of the data. Moreover, the transmitting component 1004 transmits the print data subjected to the image formation process, to the printing component 306, and the printing component 306 performs printing for the CMYK version and the spot color version in accordance with the print data.

As described above, in Embodiment 1, when the image data subjected to rendering for the spot color is stored in the equipped MFP 102, the image data is compared with the result of rendering for the four colors, and then the difference between each pixel value of the CMYK version of the spot color image data and the corresponding pixel value of the four-color image data is extracted. Thereafter, the extracted difference is retained as the difference information together with the image data. In this way, even when the image data is to be printed out by using the printer not compatible with the spot color, it is possible to print the image data without troubles by using the difference information for a part where the spot color is used.

Embodiment 2

In Embodiment 1, in order to reproduce a natural print image by printing spot color image data with the four colors of CMYK, only the pixel values of the CMYK version of the spot color image data are restored to the pixel values of the four color image data for four color printing.

Embodiment 2 is designed to be able to reproduce characteristics of the spot color toner as well. Here, Embodiment 2 will be described by using an example where the spot color toner is a tight magenta toner. A light magenta toner has a characteristic that it can reproduce a smooth highlighted part.

Figure 12:
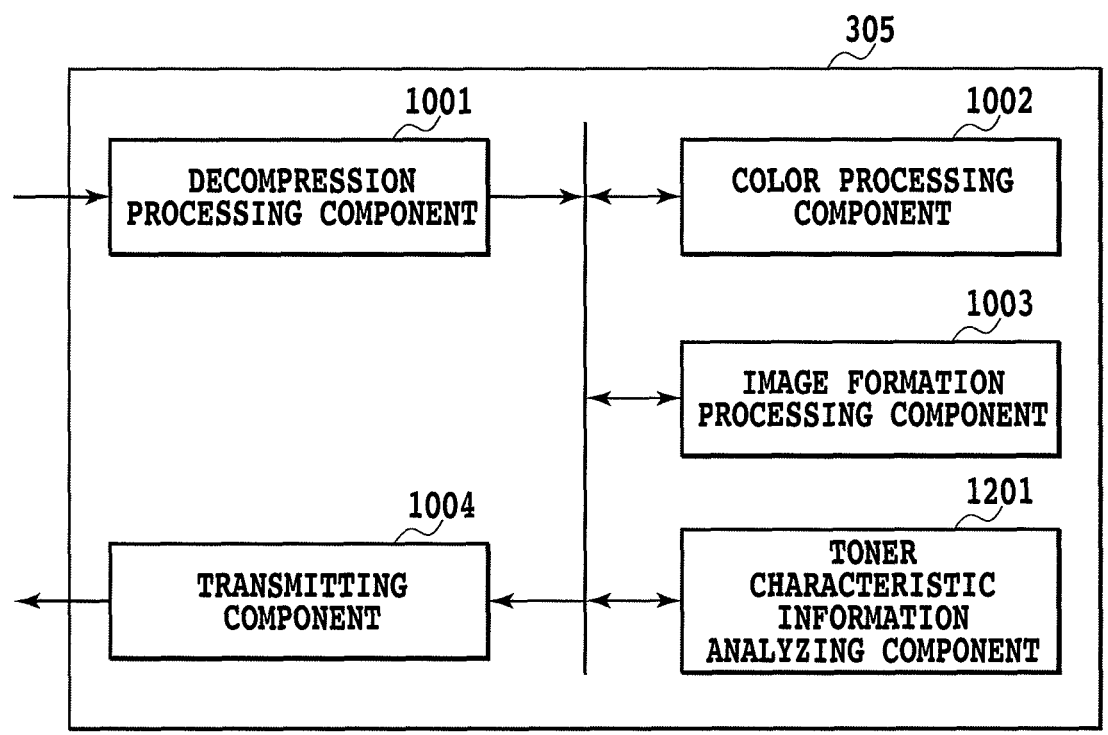
FIG. 12 is a block diagram showing a configuration of an image processing component according to Embodiment 2.

FIG. 12 is a view showing a configuration of the image processing component 305 of the MFP illustrated in FIG. 3 according to this embodiment, which includes the decompression processing component 1001, the color processing component 1002, the image formation processing component 1003, the transmitting component 1004, and a toner characteristic information analyzing component 1201.

Figure 13:
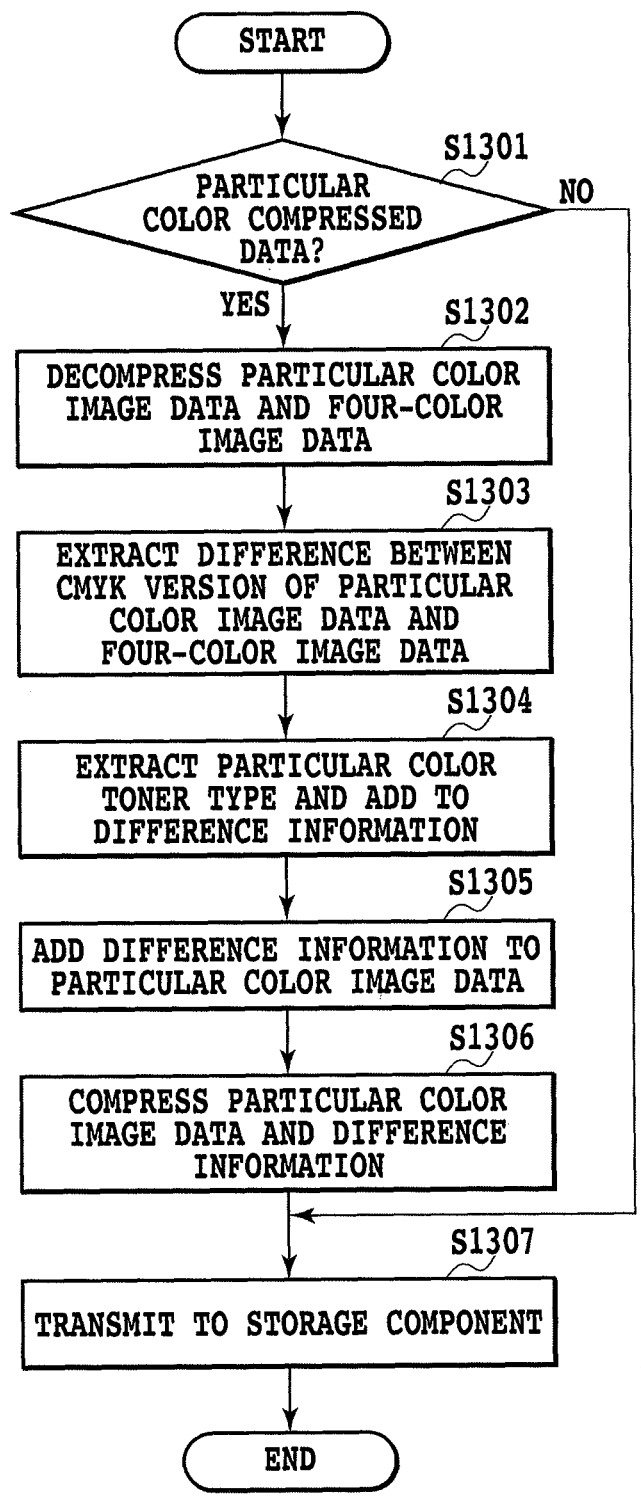
FIG. 13 is a flowchart showing an outline of processing executed by a storage processing component according to Embodiment 2.
Figure 14:
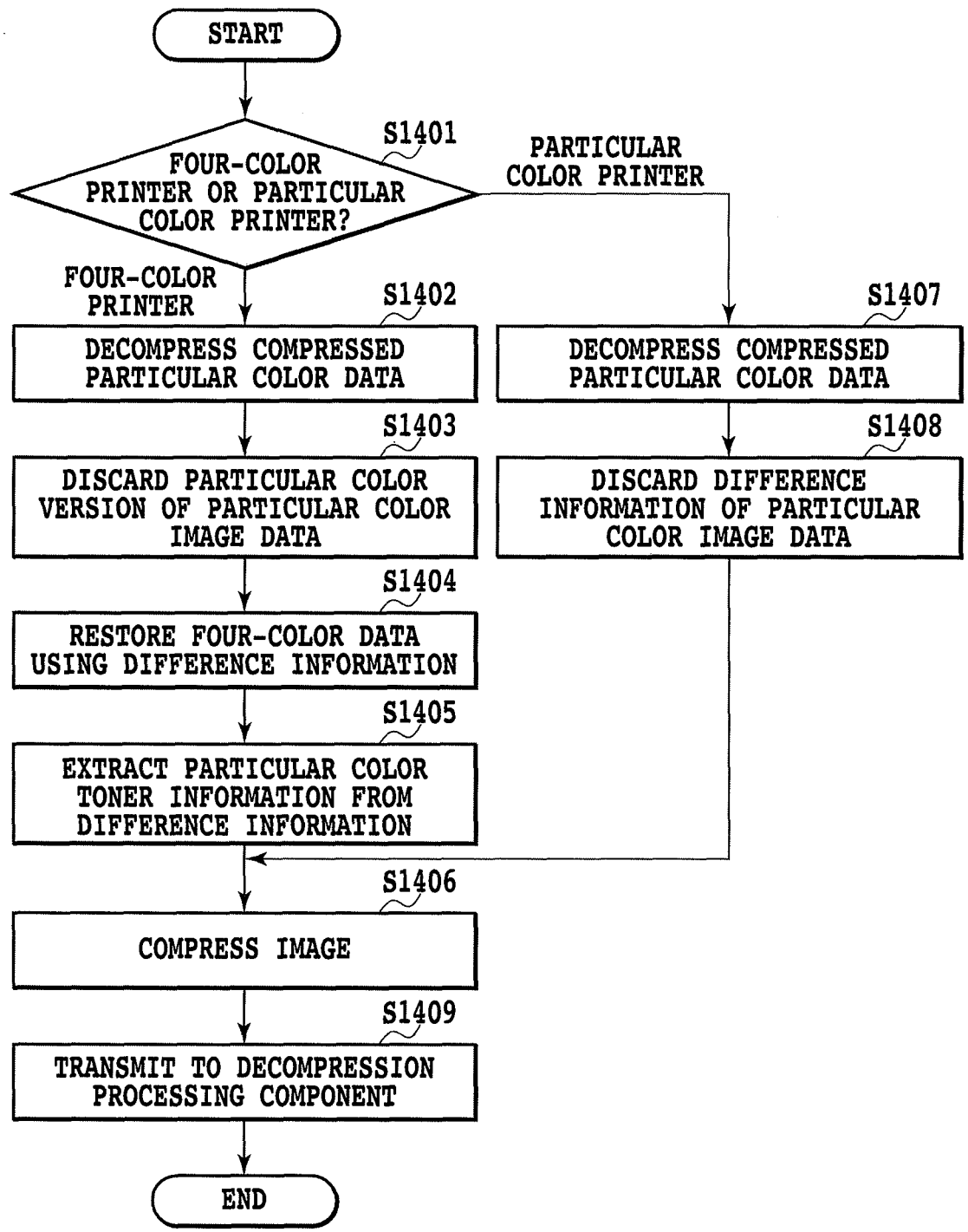
FIG. 14 is a flowchart showing an outline of processing executed by an output processing component according to Embodiment 2.
Figure 15:
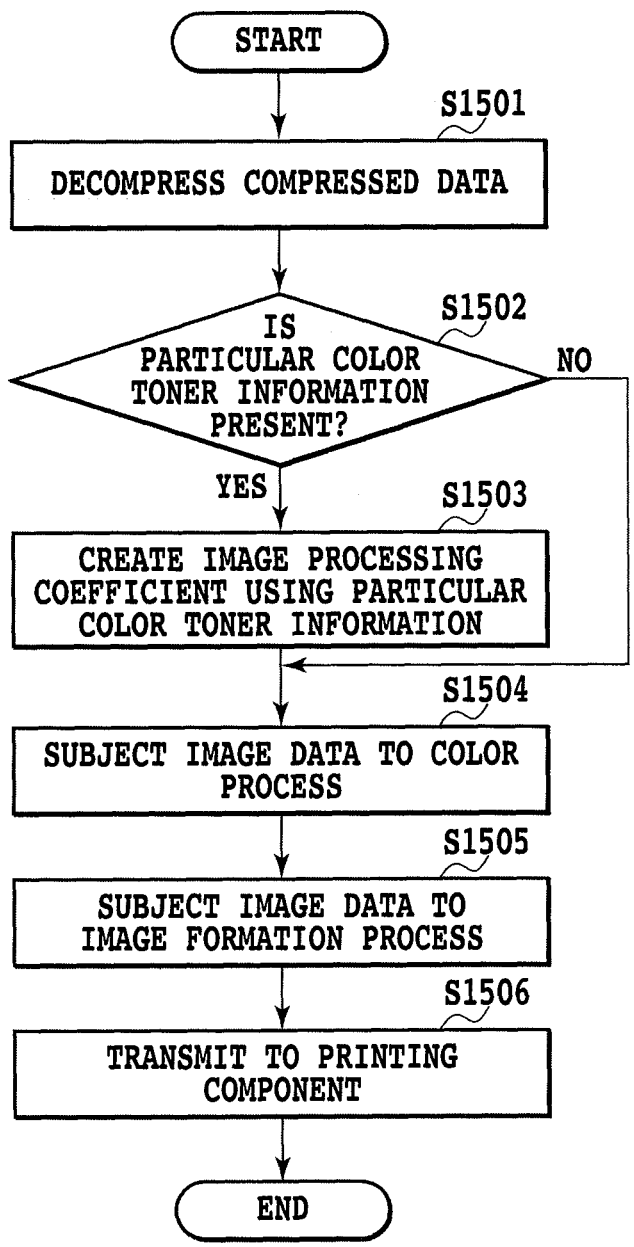
FIG. 15 is a flowchart showing an outline of processing executed by the image processing component according to Embodiment 2.

FIG. 13, FIG. 14, and FIG. 15 are flowcharts for explaining outlines of processing to be executed by the respective components constituting the image forming apparatus of this embodiment. Specifically, FIGS. 13, 14, and 15 corresponds to the storage processing component 302, the output processing component 307, and the image processing component 305, respectively.

In Embodiment 2, descriptions will be first provided for the processing by the storage processing component 302 of the equipped MFP 102 in the case of storing compressed data in the storage component 303 of the equipped MFP 102.
(Description of Storage Processing Component)

First, the storage job information receiving/analyzing component 602 in the storage processing component 302 determines whether or not the data to be subjected to a storing process from now contains the compressed spot color data (S1301).

When the compressed spot color data are determined to be present, the decompression processing component 601 decompresses the compressed spot color data and the compressed tour-color data and acquires the spot color image data and the four-color image data (S1302).

Next, by using both types of the image data, the difference extraction processing component 603 extracts the difference between each pixel value of the CMYK version of the spot color image data and the corresponding pixel value of the four-color image data (S1303). Moreover, the difference extraction processing component 603 also extracts information as to which type of the toner is used and adds the spot color toner type information to the difference information (S1304). In this embodiment, since the spot color toner is the light magenta toner, the information indicating the light magenta toner is added.

The difference information adding component 606 adds the difference information thus extracted to the spot color image data (S1305).

Next, in step S1306, the compression processing component 604 compresses the spot color image data and the difference information and thereby generates the compressed spot color data. At this time, the four-color image data are discarded.

Lastly, the transmitting component 605 transmits the generated spot color compressed data to the storage component 303 of the equipped MFP 102 (S1307).

When the compressed spot color data are not present in step S1301, the processing proceeds to step S1307 where the transmitting component 605 transmits the compressed four-color data to the storage component 303 of the equipped MFP 102 as it is, that is, without executing any process on the compressed four-color data.
(Description of Output Processing Component)

Next, processing in the case of printing out the image data stored in the storage component 303 of the equipped MFP 102 by using the different MFP will be described with reference to the flowchart in FIG. 14.

Here, of the steps shown in the flowchart of FIG. 14, detailed description will be omitted for steps common to the steps in the flowchart of FIG. 9 of the above-described Embodiment 1.

First, a user selects a job stored in the storage component 303 of the equipped MFP 102 from a stored document list. Subsequently, when the user selects which MFP to be used for printing from a print destination list, information on the selected job and the print destination is transmitted to the storage component 303.

As similar to Embodiment 1, in this embodiment, descriptions will be first provided for the case where the print destination is the non-equipped MFP 103, and then for the case where the print destination is the equipped MFP 102.

Contents of steps S1401 to S1404 in FIG. 14 are the same as the above-described contents of steps S901 to S904 in FIG. 9, which will be briefly described below. First, determination is made as to whether or not the printing out is to be performed by using the equipped MFP 102 having the spot color printing function (S1401). If it is determined that the printing is to be performed by using the non-equipped MFP 103 not having the spot color printing function, the compressed spot color data is decompressed by the decompression processing component 701 (S1402) and the spot color image data and the difference information obtained by the decompression are transmitted to the difference information restoring component 703 (S1403). The difference information restoring component 703 discards the data of the spot color version of the spot color image data (S1403) and restores the four-color image data by adding each pixel value in the difference information to the corresponding pixel value of the four-color data (S1404).

Moreover, in this embodiment, the difference information restoring component 703 extracts the information on the type of the spot color toner from the difference information and generates spot color toner information (S1405).

Then, the compression processing component 704 subjects the restored four-color image data and the spot color information to the compression process and thereby generates the compressed four-color data (S1406).

The transmitting component 705 transmits the compressed four-color data which included the compressed data of four-color image data and the compressed data of spot color information to the decompression processing component 1001 in the image processing component 305 of the non-equipped MFP 103 (S1409).

If it is determined that the printing out is to be performed by using the equipped MFP 102, the decompression process is performed (S1407) and then the difference information is discarded from the spot color image data by the difference information restoring component 703 (S1408). Thereafter, the spot color image data after discarding the difference information are compressed by the compression processing component 704 to generate the compressed spot color data (S1406). The compressed spot color data is then transmitted from the transmitting component 705 to the decompression processing component 1001 (S1409).

(Description of Image Processing Component)

Next, the image processing component 305 of the non-equipped MFP 103 will be described with reference to FIG. 15. Here as well, detailed description will be omitted for processes in the flowchart of FIG. 15 which are common to those in the flowchart of FIG. 11 in the above-described Embodiment 1.

First, the four-color compressed data are decompressed by the decompression processing component 1001 (S1501).

Then, the toner characteristic information analyzing component 1201 determines whether or not the decompressed information has the spot color toner information in addition to the four-color image data (S1502).

As a result, if the decompressed information has the spot color toner information, the toner characteristic information analyzing component 1201 determines a content of the image process for achieving a visual effect of the spot color toner by using the spot color toner information, and creates an image processing coefficient (S1503). Regarding the content of this image process, the image process to be carried out is associated with each type of the spot color toner in advance. Accordingly, the content of the image process corresponding to the specified spot color toner is determined when the spot color toner is specified by the spot color toner information. For example, in this embodiment, the spot color toner is the light magenta toner, whose visual characteristic usually is smoothness. Therefore, the light magenta toner is associated in advance with a stronger smoothing process than a normal case.

Meanwhile, when the spot color toner is a "transparent toner", a visual characteristic of the transparent toner is usually glossiness. For this reasons as described previously, overall amounts of the color toners are increased or a fixation speed of a printer engine is slowed down when the spot color toner is the transparent toner, for example. As described above, the toner characteristic information analyzing component 1201 issues an instruction to the image formation processing component 1003 in accordance with the content of the preset image process. In this embodiment, an instruction corresponding to the light magenta toner, i.e., an instruction to perform the smoothing process that is stronger than a normal case, is issued.

The rest of the processing is substantially the same as the processing starting from step S1102 in FIG. 11.

Specifically, the color processing component 1002 executes the color process such as providing the optimum gamma characteristic or adjusting the color densities (S1504). Then, the image formation processing component 1003 executes the image formation process such as a screen process or an error diffusion process (S1505), and also executes a smoothing process based on the instruction from the toner characteristic information analyzing component 1201. Thereafter, the print data subjected to the image formation process is transmitted from the transmitting component 1004 to the printing component 306 (S1506).

Upon receipt of the data, the printing component 306 of the non-equipped MFP 103 prints, in the four colors of CMYK, the print data subjected to the image formation process.

The image processing component 305 of the MFP 102 is the same as that in Embodiment 1 and explanation thereof will be thus omitted.

As described above, according to Embodiment 2, it is possible to reproduce the visual characteristic of the spot color toner in addition to the contents of Embodiment 1.

Embodiment 3

While Embodiments 1 and 2 use the image data containing the spot color version of data, Embodiment 3 always use the CMYK version of the four-color image data.

Figure 16:
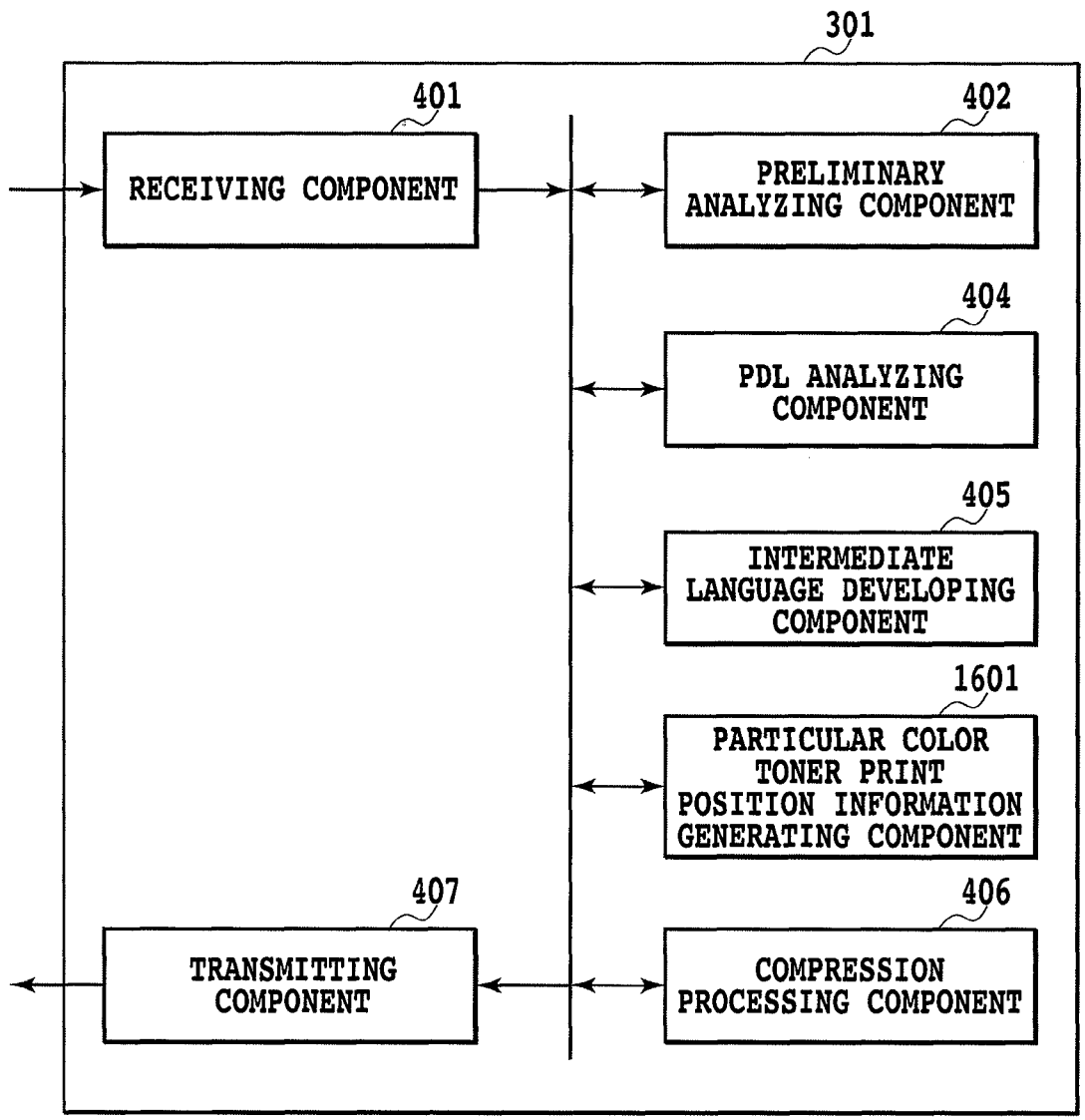
FIG. 16 is a block diagram showing a configuration of a PDL processing component according to Embodiment 3.

FIG. 16 is a view showing a configuration of the PDL processing component 301 in FIG. 3 of this embodiment, which includes the receiving component 401, the preliminary analyzing component 402, the PDL analyzing component 404, the intermediate language developing component 105, the compression processing component 406, the transmitting component 407, and a spot color toner print position information generating component 1601.

Figure 17:
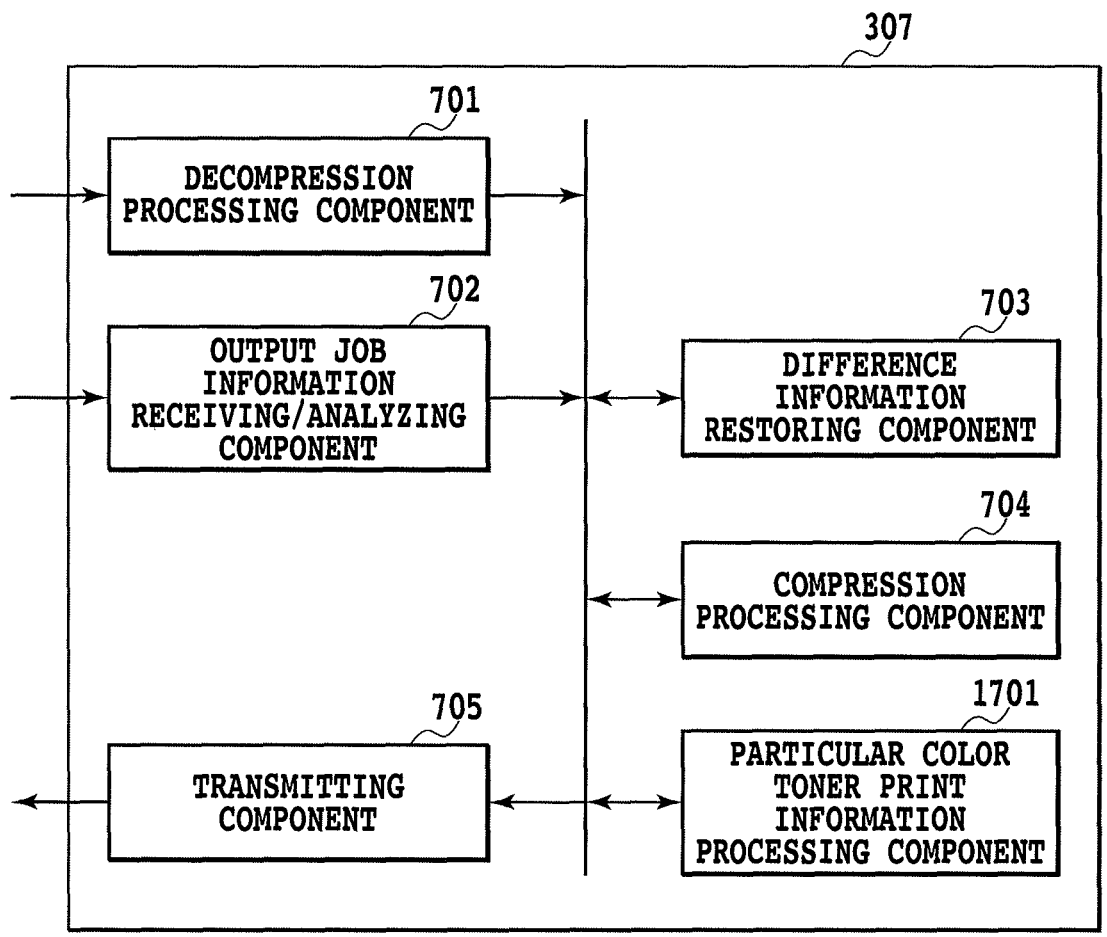
FIG. 17 is a block diagram showing a configuration of an output processing component according to Embodiment 3.

FIG. 17 is a view showing a configuration of the output processing component 307 in FIG. 3 of this embodiment, which includes the decompression processing component 701, the output job information receiving/analyzing component 702, the difference information restoring component 703, the compression processing component 704, the transmitting component 705, and a spot color toner print information processing component 1701.

Figure 18:
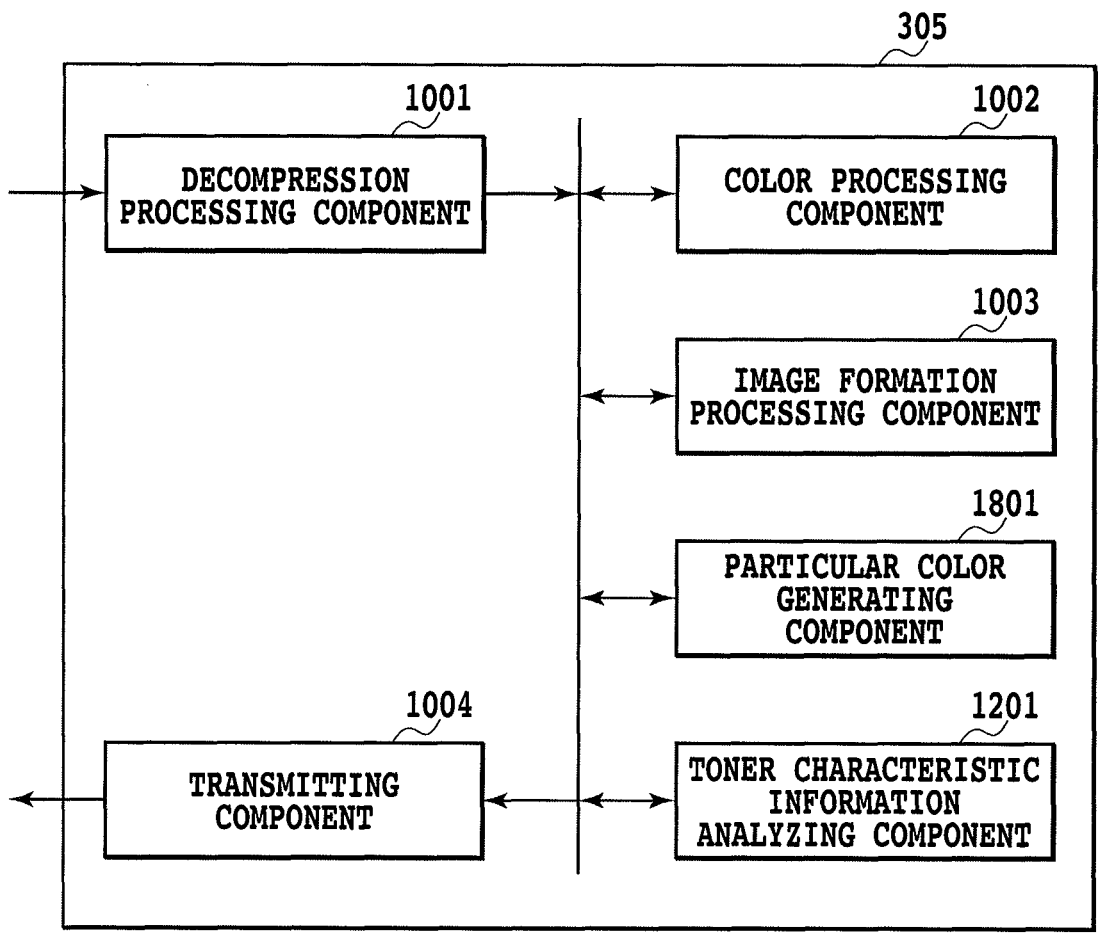
FIG. 18 is a block diagram showing a configuration of an image processing component according to Embodiment 3.

FIG. 18 is a view showing a configuration of the image processing component 305 in FIG. 3 of this embodiment, which includes the decompression processing component 1001, the color processing component 1002, the image formation processing component 1003, the transmitting component 1004, the toner characteristic information analyzing component 1201, and a spot color generating component 1801.

Figure 19:
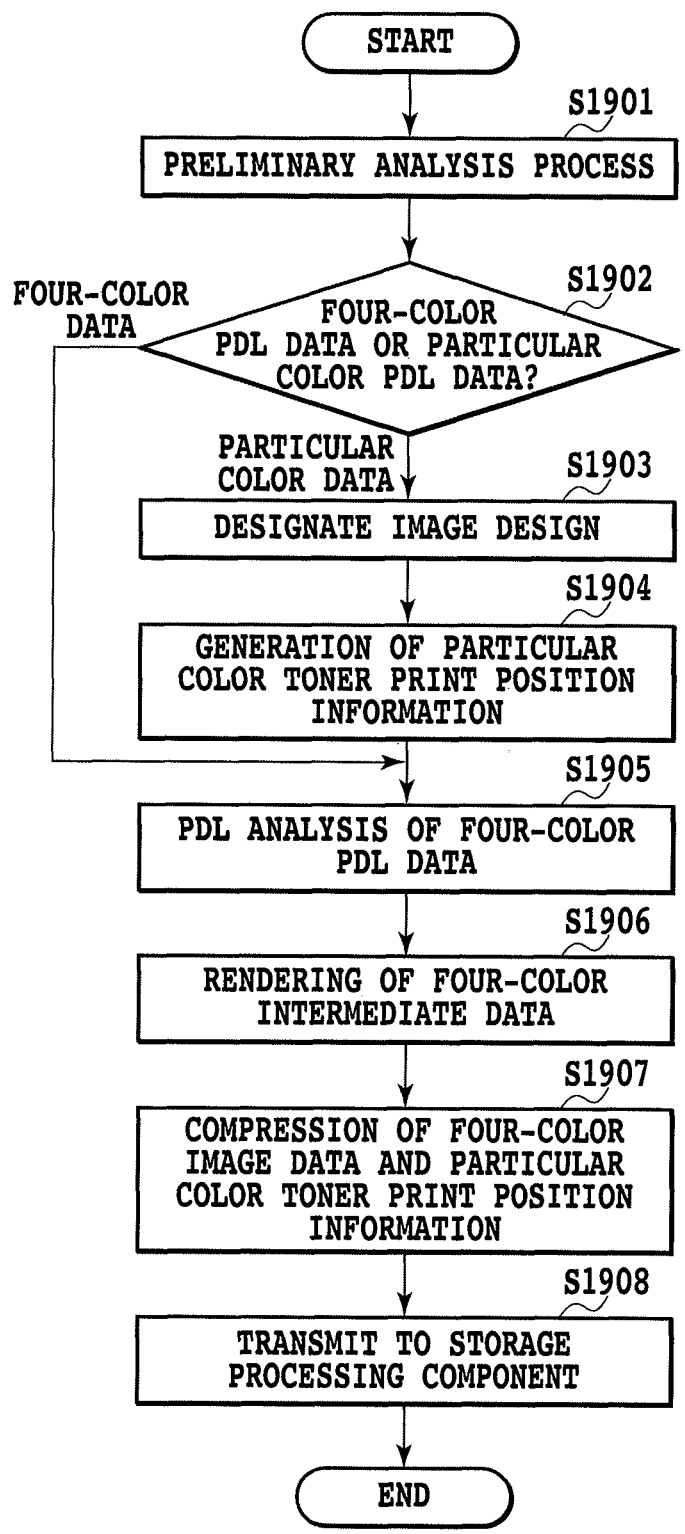
FIG. 19 is a flowchart showing an outline of processing executed by the PDL processing component according to Embodiment 3.
Figure 20:
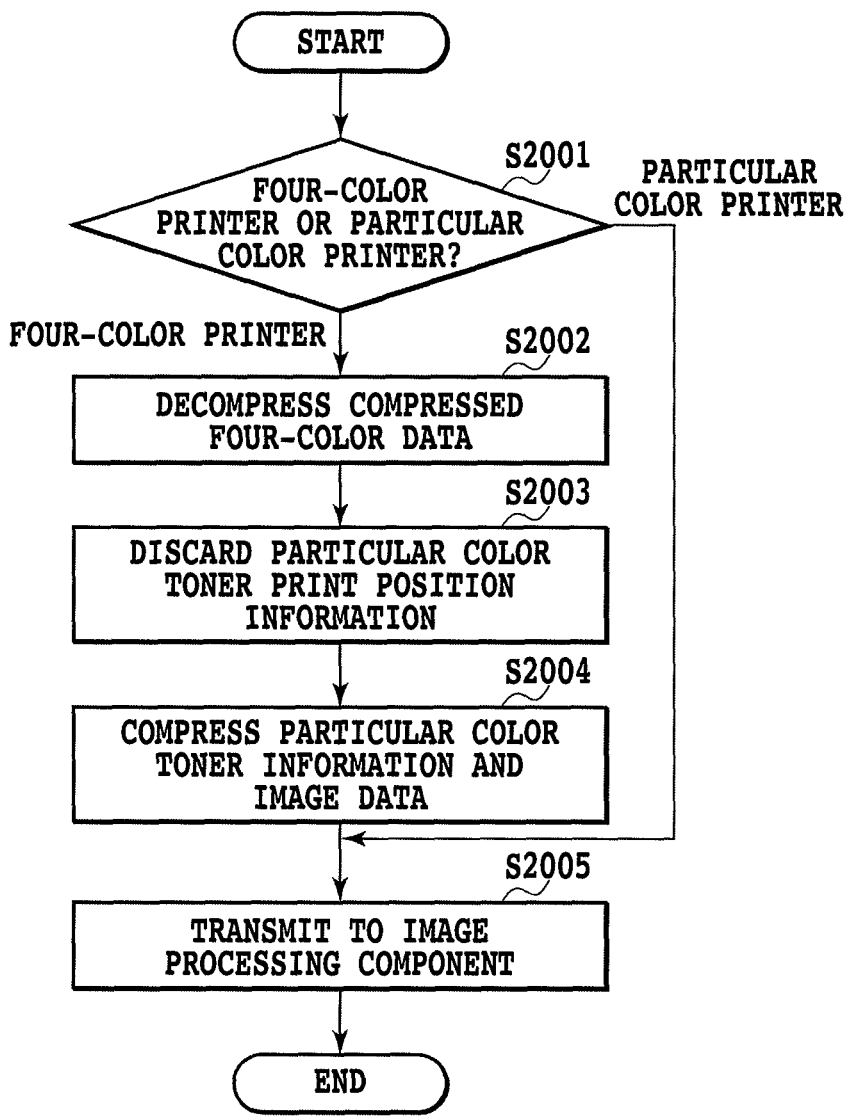
FIG. 20 is a flowchart showing an outline of processing executed by the output processing component according to Embodiment 3.
Figure 21:
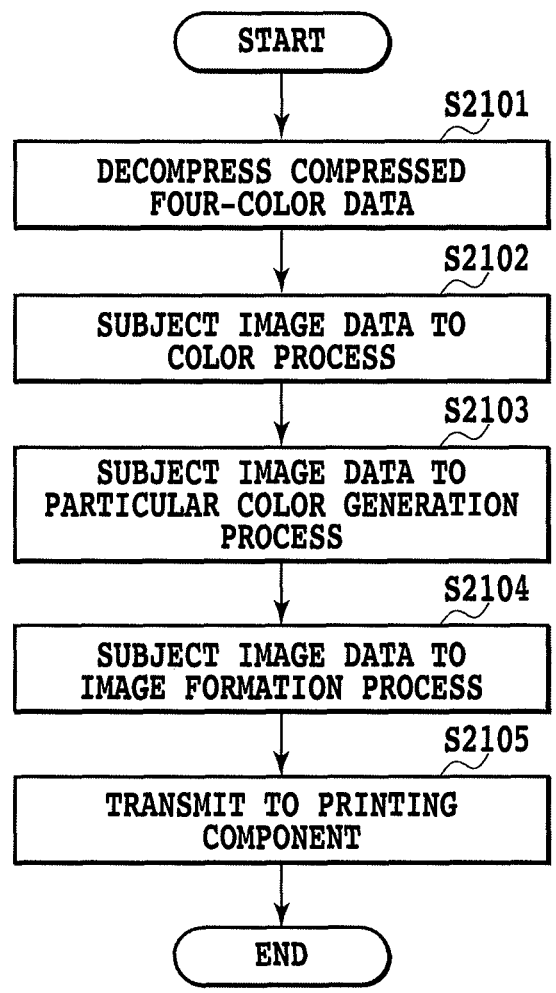
FIG. 21 is a flowchart showing an outline of processing executed by the image processing component according to Embodiment 3.

FIG. 19, FIG. 20, and FIG. 21 are flowcharts for explaining outlines of processing to be executed by the respective components constituting the image forming apparatus according to this embodiment. Specifically, FIGS. 19, 20, and 21 corresponds to the PDL processing component 301, the output processing component 307, and the image processing component 305, respectively.

Figure 23:
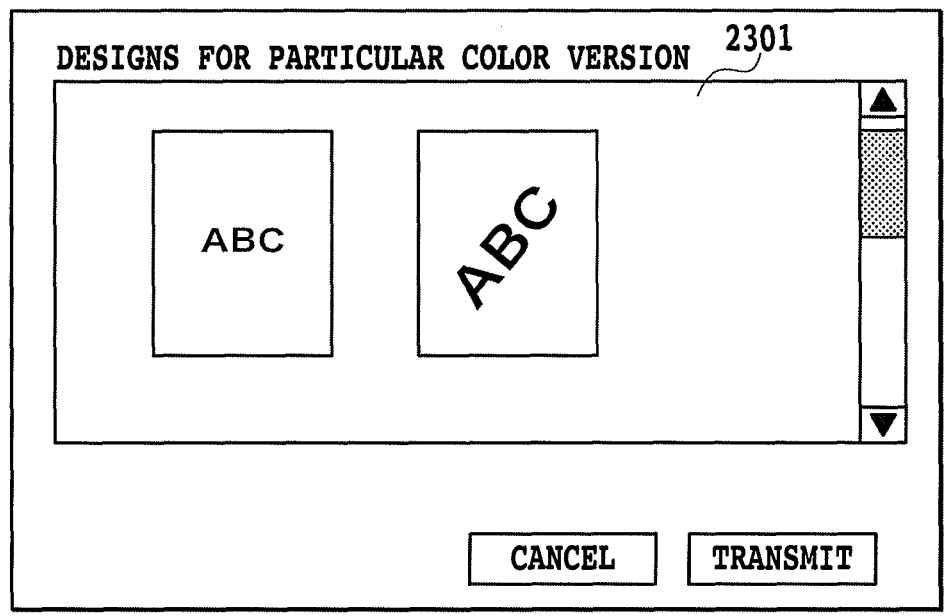
FIG. 23 is a view showing an example of a screen displayed on a host computer screen.

FIG. 23 shows an example of a screen to be displayed on a screen of the host computer 101. This embodiment will also be described below on the assumption that the PDL data transmitted from the transmitting component 204 of the host computer is received by the received 401 in the PDL processing component 301 of the equipped MFP 102.

First, the PDL processing component 301 of the equipped MFP 102 will be described with reference to FIG. 16 showing the configuration thereof and FIG. 19 showing the process flow thereof.

(Description of PDL Processing Component)

Steps S1901 and S1902 are the same as the above-described steps S201 and S502 in FIG. 5, which will be briefly described below. The preliminary analyzing component 402 collects the information required for determining whether or not it is necessary to subject the received PDL data to the spot color process (S1901), and determination is made, based on the information, as to whether or not it is necessary to perform the spot color process (S1902).

If the spot color process is determined to be necessary, user's designation of an image design (see reference numeral 2301 in FIG. 23) for the printing in the spot color version is inputted next (S1903). The user's designation is performed by way of, for example, the panel screen which serves as the user interface and is provided to the UI component 304 of the equipped MFP 102 receiving various instructions from the user.

In this way, information on the designated image design is transmitted to the spot color toner print position information generating component 1601 through the UI component 304 of the equipped MFP 102 (illustration of this process is omitted in the flowchart in FIG. 19).

Then, based on the image design designated by the user, the spot color toner print position information generating component 1601 generates binary spot color toner print position information which defines a pixel where the spot color toner is used for the printing as "1" and defines a pixel where the spot color toner is not used for the printing as "0" (S1904).

Steps S1905 and S1906 are the same as the above-described steps S507 and S508 in FIG. 5, which will be briefly described below. The PDL analyzing component 404 analyzes the four-color PDL data and generates the intermediate language (the four-color intermediate data) (S1905). Subsequently, the intermediate language developing component 405 renders the intermediate language and generates the four-color image data (S1906).

Then, the compression processing component 406 compresses the four-color image data together with the spot color toner print position information and generates the compressed four-color data (S1907).

Then, the transmitting component 407 transmits the compressed four-color data to the decompression processing component 601 of the storage processing component 302 (S1908). Moreover, as the job information, the information as to whether or not it is necessary to perform the spot color process is transmitted to the storage job information receiving/analyzing component 602 of the storage processing component 302.

In this embodiment as well, as similar to Embodiment 2, the spot color toner type information is added to the compressed four-color data by the storage processing component 302 in the equipped MFP 102. The compressed four-color data is then stored in the storage component 303 inside the equipped MFP 102. Specifically, the information on the type of the spot color toner used is extracted by the difference extraction processing component 603 in the storage processing component 302, and the four-color image data after the spot color toner type information is added as the difference information is stored in the storage component 303.

If the preliminary analyzing component 402 determines that the spot color process is not necessary in step S1902, only the four-color data are subjected to the processes in step S1905 to step S1908.

(Description of Output Processing Component)

Next, the processing in the case of printing out the image data stored in the storage component 303 of the equipped MFP 102 by using a different MFP will be described with reference to a flowchart in FIG. 20.

In this embodiment as well, as similar to Embodiment 1 and 2, descriptions will be first provided for the case where the print destination is the non-equipped MFP 103, and then for the case where the print destination is the equipped MFP 102.

First, upon receipt of the information from the UI component 304 of the equipped MFP 102, the storage component 303 of the equipped MFP 102 transmits the job selected from the stored document list 2201 to the output processing component 307.

Then, the output job information receiving/analyzing component 702 of the output processing component 307 determines whether or not the received job is to be printed out by the non-equipped MFP 103 or the equipped MFP 102 (S2001).

If the result shows that the printing out is to be performed by the non-equipped MFP 103, the decompression processing component 701 decompresses the compressed four-color data (S2002) and transmits the spot color toner print position information obtained by the decompression, to the spot color print information processing component 1701. Subsequently, the spot color print information processing component 1701 discards the spot color print position information (S2003).

Then, the compression processing component 704 compresses the four-color image data and the spot color toner type information and generates the compressed four-color data (S2004).

Lastly, the transmitting component 705 transmits the generated compressed four-color data to the decompression processing component 1001 in the image processing component 305 of the non-equipped MFP 103 (S2005).

If the output job information receiving/analyzing component 702 determines in step S2001 that the printing out is to be performed by the equipped MFP 102, the processing proceeds to step S2005 where the transmitting component 705 transmits the compressed four-color data to the image processing component 305 of the equipped MFP 102.

(Description of Image Processing Component)

Next, the image processing component 305 of the non-equipped MFP 103 will be described. Meanwhile, the processing by the image processing component 305 includes the similar operations to those in Embodiment 2. Thus, the description of those operations will be omitted. The image processing component 305 of the equipped MFP 102 will be described with reference to a flowchart in FIG. 21.

First, upon receipt of the compressed four-color data, the image processing component 305 of the equipped MFP 102 decompresses the compressed four-color data by using the decompression processing component 1001 (S2101).

Then, on the four-color image data obtained by the decompression, the color processing component 1002 performs the color process as previously described in Embodiment 1 and 2 (S2102).

Then, by using a four-dimensional lookup table, the spot color generating component 1801 subjects the image data after completion of the color process to a spot color generation process so as to generate a spot color toner printing amount (S2103). This spot color generation process is performed using the spot color toner print position information. Specifically, the spot color toner printing amount is generated for each pixel having the value "1" in this information whereas no process is performed on each pixel having the value "0" in this information.

Subsequently, the image formation processing component 1003 performs the image formation process as previously described in Embodiment 1 and 2 (S2104).

Then, the transmitting component 1004 transmits the print data subjected to the image formation process, to the printing component 306 (S2105).

Upon receipt of the print data, the printing component 306 of the equipped MFP 102 performs printing of the CMYK and spot color versions in accordance with the print data.

As described above, Embodiment 3 does not use the spot color image data. Accordingly, it is possible to further reduce the volume of the image data as compared to Embodiment 1.

Other Embodiments

As has been described, the MFP having the spot color printing function explained in the embodiments of the present invention is assumed to be used as part of a network printing system in which the MFP is mutually connected to one or more MFPs not having the spot color printing function, through a network. Moreover, the present invention can also be grasped as the invention of a method of controlling each of the processes executed by the MFPs.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-216918, filed Aug. 26, 2008, which is hereby incorporated by reference herein in its entirety.

What is claimed is:

1. An image forming apparatus connected to a network and provided with a spot-color printing function, comprising:
   a generating component configured to generate spot-color image data and four-color image data;
   a difference extracting component configured to extract difference information indicating a difference between each pixel value of a CMYK version of the spot-color image data and a corresponding pixel value of the four-color image data, by using the spot-color image data and the four-color image data;
   a storing component configured to store the spot-color image data and the difference information;
   a determining component configured to determine, at a time of performing printing by a different image forming apparatus through the network, whether or not the different image forming apparatus has the spot-color printing function;
   an image data restoring component configured to restore the four-color image data for printing in the different image forming apparatus by using the CMYK version of the spot color image data and the difference information, which are stored in the storing component, when the determining component determines that the different image forming apparatus does not have the spot-color printing function;
   an image data transmitting component configured to transmit the restored four-color image data to the different image forming apparatus; and
   wherein the difference information extracted by the difference extracting component includes information on a spot-color toner type,
   the image data restoring component further extracts the information on the spot-color toner from the difference information and generates spot-color toner information, and
   the image data transmitting component transmits the restored four-color image data and the spot-color toner information to the different image forming apparatus.

2. The image forming apparatus according to claim 1, wherein the image data transmitting component transmits only the spot-color image data to the different image forming apparatus when the determining component determines that the different image forming apparatus has the spot-color printing function.

3. A network printing system comprising at least one unit of the image forming apparatus according to claim 1.

4. A method of controlling an image forming apparatus connected to a network and provided with a spot-color printing function, the method comprising the steps of:
   generating spot-color image data and four-color image data;
   extracting difference information indicating a difference between each pixel value of a CMYK version of the spot-color image data and a corresponding pixel value of the four-color image data by using the spot-color image data and the four-color image data;
   storing the spot-color image data and the difference information;
   determining, at a time of performing printing by a different image forming apparatus through the network, whether or not the different image forming apparatus has the spot-color printing function;
   restoring the four-color image data by using the CMYK version of the spot color image data and the difference information for printing in the different image forming apparatus, which are stored in the storing step, when the different image forming apparatus is determined not to have the spot-color printing function in the determining step;
   transmitting the restored four-color image data to the different image forming apparatus; and
   wherein the difference information extracted in the extracting step includes information on a spot-color toner type,
   the restoring step further comprises extracting the information on the spot-color toner from the difference information and generating spot-color toner information, and
   transmitting the restored four-color image data and the spot-color toner information to the different image forming apparatus, in the transmitting step.

* * * * *